United States Patent [19]

Rosen

[11] Patent Number: 5,611,479
[45] Date of Patent: Mar. 18, 1997

[54] FRICTION STIR WELDING TOTAL PENETRATION TECHNIQUE

[75] Inventor: Charles D. Rosen, Huntington Beach, Calif.

[73] Assignee: Rockwell International Corporation, Seal Beach, Calif.

[21] Appl. No.: 602,522

[22] Filed: Feb. 20, 1996

[51] Int. Cl.⁶ .................................................. B23K 20/12
[52] U.S. Cl. .................................. 228/112.1; 228/2.1
[58] Field of Search .......................... 228/112.1, 114.5, 228/119, 189, 234.1, 2.1; 156/73.1

[56] References Cited

U.S. PATENT DOCUMENTS

| | | | |
|---|---|---|---|
| 4,144,110 | 3/1979 | Luc | 228/112.1 |
| 4,260,094 | 4/1981 | Stroo | 228/112.1 |
| 5,460,317 | 10/1995 | Thomas et al. | 228/112.1 |

FOREIGN PATENT DOCUMENTS 1567135  5/1980  United Kingdom.

Primary Examiner—Samuel M. Heinrich
Attorney, Agent, or Firm—Harry B. Field; Steven E. Kahm

[57] ABSTRACT

A method for ensuring complete penetration of a friction stir weld using a rotating pin friction stir welding tool comprising chamfering the bottom of the plates to be welded along the faying edges. Placing the plates on a back up plate. Inserting the pin friction stir welding tool into the plates to the depth of the chamfer and translating it along the faying surface to plasticize the material in the plates. The plasticized material will flow into the volume defined by of the chamfer at the bottom of the plates and the back up plate. A visual inspection will show if the weld penetrated fully through the plates if the chamfered volume is filled with material which flowed in while plasticized.

4 Claims, 2 Drawing Sheets

FRICTION STIR WELDING TOTAL PENETRATION TECHNIQUE

BACKGROUND OF THE INVENTION

1. Field of the Invention

This invention related to friction stir welding and more particularly to a method for insuring 100% penetration of the material thickness.

2. Description of the Related Art

The Welding Institute in Cambridge, England has developed a new method of joining materials by fiction stir welding (see U.S. Pat. No. 5,460,317). This method employs a tool having a pin which is plunged into and stirs the material to be joined to a plastic state. The pin preferably has a configuration for forcing the plasticized material downward and backward. When the pin is moved along the faying surface the plasticized material flows from the front of the pin to the rear as the pin translates the faying surface. A shoulder at the top of the pin keeps plasticized material from leaving the joint region. The pin extends almost to the bottom of the material to be joined. The pin can not extend all the way through the material since the material to be joined is resting on a back up bar. When the plasticized material is forced downward it is resisted by the material below the tip of the pin sometimes resulting in a lack of penetration all the way to the bottom of the faying surface and also by the back up bar at the bottom of the faying surfaces. The incomplete penetration of the weld can not be detected because the pin leaves an untouched faying surface portion and because of the intimate contact of the back up plate with the faying surface. X-rays and other means of detecting the weld quality are expensive, difficult to use and unreliable, especially to detect lack of penetration.

SUMMARY OF THE INVENTION

Using the stir friction welding technique a chamfer is placed at the bottom of the work piece at the faying surface. The plasticized material from the friction stir weld will then enter the volume created at the bottom of the faying surface by the chamfer. Visual inspection for compete penetration of the weld is then possible since the plasticized material will flow to the bottom of the weld at the back up bar. This provides a higher quality joint with visual indication of a complete weld.

OBJECTS OF THE INVENTION

It is an object of the invention to remove the oxides at the bottom of the weld enhancing the consolidation of the weld for a better quality weld.

It is an object of the invention to decrease the tolerances which need to be maintained in the pin depth to yield a completly penetrated weld.

It is a further object of the invention to provide a visual means to ensure the plate was completely welded.

It is also an object of the invention to ensure a complete penetration of the weld.

Other objects, advantages and novel features of the present invention will become apparent from the following detailed description of the invention when considered in conjunction with the accompanying drawings.

DETAILED DESCRIPTION OF THE PREFERRED EMBODIMENT

Friction stir welding is a new process for joining materials developed by The Welding Institute in Cambridge, England. U.S. Pat. No. 5,460,317 issued Oct. 24, 1995, describes the basic process for friction stir welding. The process for friction stir welding uses a rotating pin for frictional contact along a faying surfaces for plasticizing a material by frictional contact. When the plasticized material cools a high quality weld results. U.S. Pat. No. 5,460,317 is attached hereto and incorporated herein by reference. A British patent application number 9405491.3 filed Mar. 21, 1994 by The Welding Institute is also attached hereto and incorporated herein by reference. The British application describes an improvement to the pin design where the pin pushes the plasticized metal downward and behind the pin for solidly filling in the area behind and below the pin with plasticized material as the pin translated along the faying surfaces.

Figure 1:
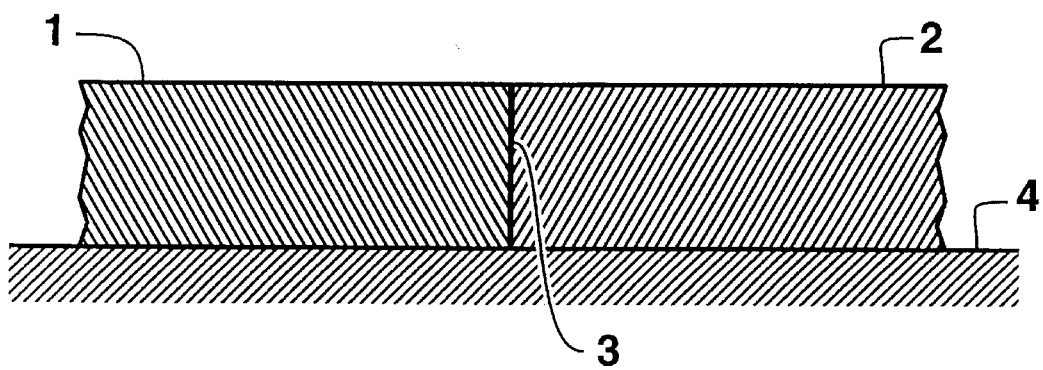
FIG. 1 is a cross section through the face to be welded showing the joint of the faying surfaces and the back up bar without a chamfer.
Figure 2:
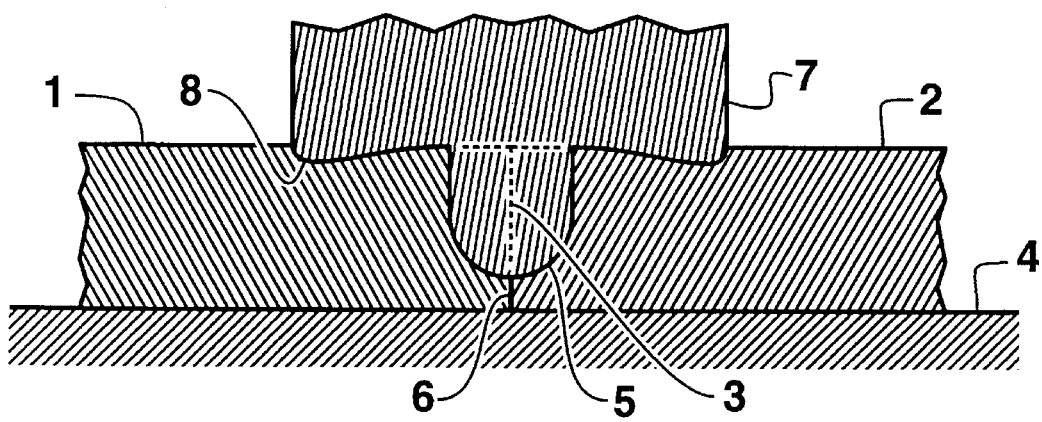
FIG. 2 is a cross section through the face to be welded showing the stir friction welding tool in the work piece without a chamfer.

FIG. 1 shows plates 1 and 2 having faying surfaces 3 adjacent to each other. The plates are resting on a back up plate 4. FIG. 2 shows friction stir welding tool 7 welding plates 1 and 2. The shoulder 8 of the tool 7 engages the top surface of plates 1 and 2. The pin frictionally plasticizes the material and thereby welds the plates together as described in U.S. Pat. No. 5,460,317 and British Patent Specification application number 9405491.3. However as seen in FIG. 2 the pin 5 is on the order of 0.015 of an inch from the bottom of plates 1 and 2, which are typically on the order of 0.25 inches thick, leaving a portion 6 of faying surface which is not directly engaged by pin 9. This results in a weld having a cross section 9 as in FIG. 3 where the bottom portion of the weld is not visible to inspection to see if the weld was complete. Further since pin 5 did not penetrate all the way through plates 1 and 2 the plasticized material may not have extended to the bottom of the plates under the tip of the pin 5 in region 6 of the faying surface.

Figure 4:
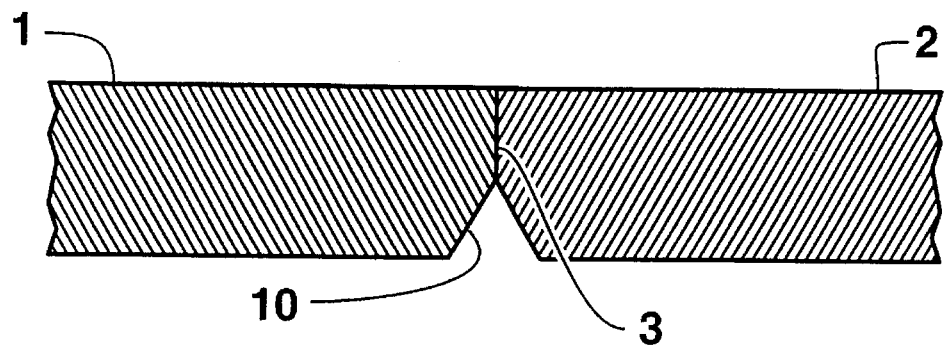
FIG. 4 is a cross section through the face to be welded showing the joint of the faying surface and the back up bar with a chamfer.

To ensure a weld with 100% penetration and a visible indication of complete penetration a chamfer 10 is placed in the bottom edge surface of plates 1 and 2 cutting into the faying surfaces 3 thus eliminating the problem of penetration in region 6 of the laying surfaces. FIG. 4 shows the plates 1 and 2 with chamfer 10. The chamfer can be on the order of 0.010 inches to 0.060 inches in depth. Chamfers having angles of 30 and 45 degrees have been used. Chamfer size is limited by the amount of plasticized material available to fill in the volume of the chamfer. This will vary according to the thickness of the plates 1 and 2, the size of the pin 5 and other factors such as the type of materials being welded, plasticizing flow rates, materials added to the plasticized materials etc.

Alternatively a chamfer can be placed on one plate only.

Cutting a chamfer 10 at the bottom of the faying surface 3 in region 6 also removes oxides from metal plates 1 and 2, resulting in a higher quality weld.

When the plasticized material files the volume of the chamfer 10 a visual inspection will show a complete 100% penetration weld.

Cracks or voids in the weld can be problematic resulting in weld failures. For some uses of welds, failures can be disastrous. Therefore a quick and reliable means for inspecting weld penetration is highly desirable.

Figure 5:
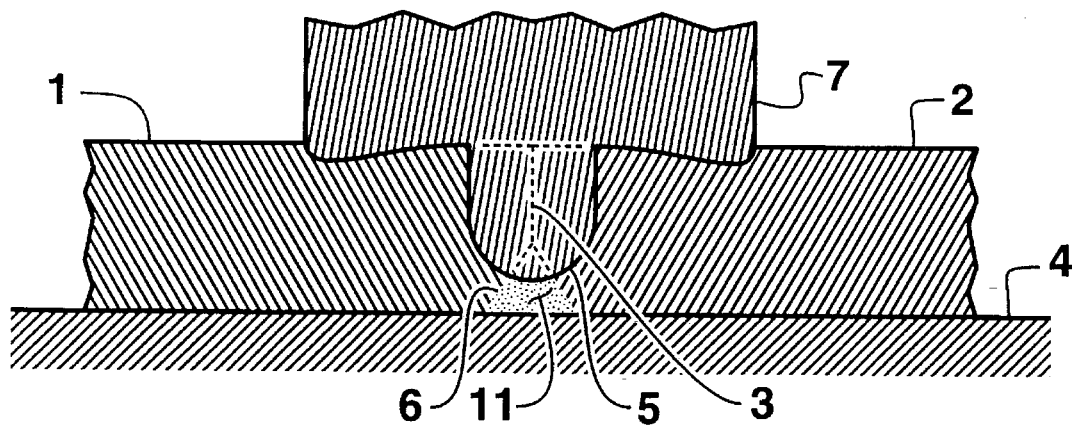
FIG. 5 is a cross section through the face to be welded showing the stir friction welding tool in the work piece with a chamfer.

Using the method of chamfering the bottom edges of the plates also allows for lesser tolerances to be used in friction stir welding since in the standard practice the pin length has to be controlled to very high tolerances to obtain a complete penetration. The chamfer allows the tip of the tool to vary slightly without effecting the resultant weld as long as plasticized material can enter the volume of the cavity created by the chamfer. FIG. 5 shows the pin 5 entering the top of the chamfer volume 10.

Figure 3:
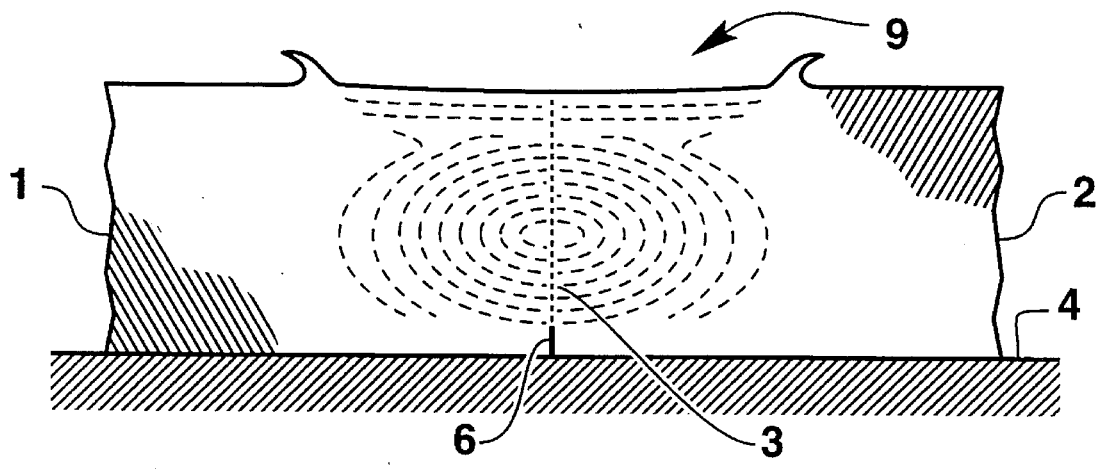
FIG. 3 shows a cross section of the face after it is welded without a chamfer.
Figure 6:
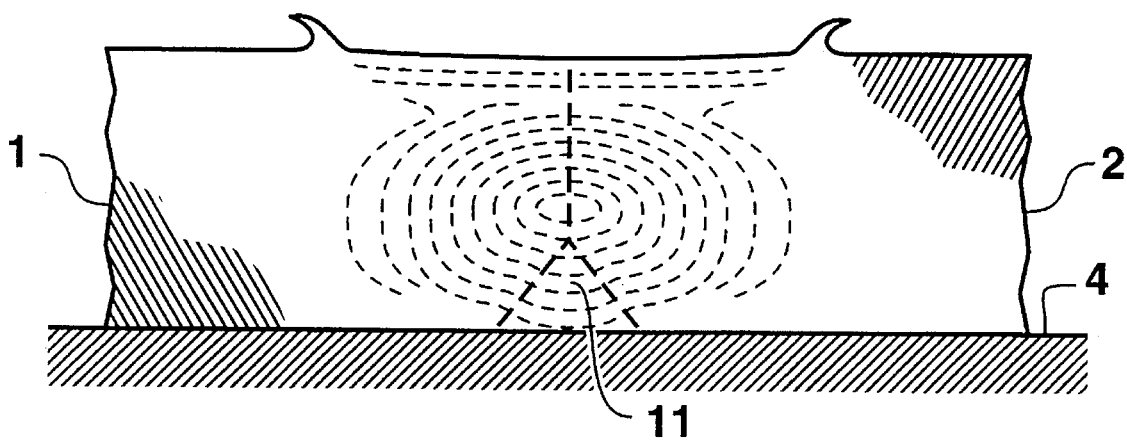
FIG. 6 shows a cross section of the face after it is welded with a chamfer.

FIG. 6 shows the increased area on the welded area at the bottom of the plates as compared to the non chamfered plates in FIG. 3.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for ensuring complete penetration of friction stir welds comprising:

obtaining a first plate having a faying surface, a top surface and a bottom surface, chamfering the first plate along the bottom of the plate at the faying surface, obtaining a second plate having a faying surface, a top surface and a bottom surface, placing the faying surfaces together, placing the first and second plates bottom surface on a back up plate, inserting a friction stir welding tool having a rotating pin into the first and second plates at the faying surfaces, the pin depth extending through the plate to the chamfer at the bottom of the plate, translating the friction stir welding tool along the length of the faying surface to frictionally stir and plasticize the plate material thus welding the two plates together wherein, plasticized material enters and fills the volume created by the chamfer at the bottom of the plate resulting in a complete penetration weld of the plates.

2. A method for ensuring complete penetration of friction stir welds as in claim 1 comprising:

chamfering the second plate along the bottom of the plate at the faying surface to increase the cavity size at the bottom of the plates which will be filled with plasticized material.

3. A method for ensuring complete penetration of friction stir welds as in claim 1 comprising:

examining the filled in chamfer volume to see if the weld completely penetrated the plates.

4. A method for ensuring complete penetration of friction stir welds as in claim 2 comprising:

examining the filled in chamfer volume to see if the weld completely penetrated the plates.

* * * * *